(12) United States Patent
Khasgiwala et al.

(10) Patent No.: US 12,468,348 B2
(45) Date of Patent: Nov. 11, 2025

(54) METHOD AND SYSTEM FOR INTELLIGENT SELECTIVITY OF MATERIAL APPLICATION

(71) Applicant: Applied Materials, Inc., Santa Clara, CA (US)

(72) Inventors: Mudit Sunilkumar Khasgiwala, Milpitas, CA (US); Subramani Kengeri, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 696 days.

(21) Appl. No.: 17/845,458

(22) Filed: Jun. 21, 2022

(65) Prior Publication Data
US 2022/0404878 A1 Dec. 22, 2022

Related U.S. Application Data

(60) Provisional application No. 63/213,553, filed on Jun. 22, 2021.

(51) Int. Cl.
*G06F 1/16* (2006.01)
*G06F 1/20* (2006.01)

(52) U.S. Cl.
CPC ............ *G06F 1/1656* (2013.01); *G06F 1/206* (2013.01)

(58) Field of Classification Search
CPC ........ G06F 1/1656; G06F 1/206; G06F 30/20; G06F 30/367; G06F 1/182; G06F 1/20
See application file for complete search history.

(56) References Cited

U.S. PATENT DOCUMENTS 10,741,501 B1 8/2020 Shirley
2017/0155746 A1* 6/2017 Yang ..................... G06F 1/203
(Continued)

FOREIGN PATENT DOCUMENTS

CN 101510229 A 8/2009
CN 107415235 A 12/2017
(Continued)

OTHER PUBLICATIONS

Application No. PCT/US2022/034369, International Preliminary Report on Patentability, Mailed On Jan. 4, 2024, 5 pages.
(Continued)

*Primary Examiner* — Lisa M Caputo
*Assistant Examiner* — Michael J Singletary
(74) *Attorney, Agent, or Firm* — Kilpatrick Townsend & Stockton LLP

(57) ABSTRACT

A method and system for applying materials to an electronic device may include generating an electromagnetic (EM) map of the device. The EM map may indicate locations of EM radiation emitted from the electronic device. The method may also include generating a thermal map of the electronic device that may indicate locations of thermal energy emitted from the device. The method may also include generating a shielding map from the EM thermal maps. The shielding map may include instructions to control a shielding apparatus, including locations on the electronic device to apply an EM shielding material and a thermal material. The method may also include controlling a shielding apparatus to apply the EM shielding material and thermal material to the electronic device, according to the shielding map. The EM shielding material and thermal material may be applied to varying depths on the electronic device.

20 Claims, 11 Drawing Sheets

(56) References Cited

U.S. PATENT DOCUMENTS

2020/0083072 A1\* 3/2020 Quli ................. H01L 21/67253
2020/0142450 A1   5/2020 Dan et al.
2021/0175084 A1\* 6/2021 Farooq ................... C25D 5/022

FOREIGN PATENT DOCUMENTS

| CN | 109640613 A  | 4/2019 |
| JP | 07150366     | 6/1995 |
| KR | 20170088284 A | 8/2017 |
| KR | 20210033059 A | 3/2021 |
| WO | 2020102931 A1 | 5/2020 |

OTHER PUBLICATIONS

International Search Report and Written Opinion mailed on Oct. 27, 2022 in International Patent Application No. PCT/US2022/034369, 8 pages.
Extended European Search Report for Application No. EP22829165.4, Mailed On Mar. 24, 2025, 5 pages.

\* cited by examiner

| Area | | Parameters | | | | | | | | |
|---|---|---|---|---|---|---|---|---|---|---|
| Value Index field | 1 | 2 | 3 | 4 | 5 | 6 | 8 | 9 | 10 | 11 |
| | | | | | | | | Thermal Materials may be Graphene, Graphite, Au, Ag, etc. | | |
| Category | location coordinates (x, y, z) | Magnetic field, mA/mm2 | S21_coupling/leakage, dB/mm2 (shielding effectiveness) | S11/Impedance or Return loss, | Spectral spurious information, (dBm, Hz) | λ/4 points (x, y, z)- maxima | Skin depth, δ (function of frequency and conductivity of the material for the shielding) | Rth, ohms | θjc, deg/watts | Young's modulus |
| LUT_1 at f1 | 0,0,0 | Value 2$_{(0,0,0)}$ | Value 3$_{(0,0,0)}$ | Value 4$_{(0,0,0)}$ | Value 5$_{(0,0,0)}$ | Value 6$_{(0,0,0)}$ | Value 8$_{(0,0,0)}$ | Value 9$_{(0,0,0)}$ | Value 10$_{(0,0,0)}$ | Value 11$_{(0,0,0)}$ |
| | 0,0,1 | 0.4 | | -1 | -1 | (.5, .5, 1.5) | 2 | 1000 | 125 | 75 |
| | 0,1,0 | 0.2 | -4 | -4 | -4 | (1,0,0) | 1 | 900 | 125 | 110 |
| | 1,0,0 | 0.5 | -2 | -2 | -2 | (0,1,1) | 10 | 40 | 150 | 135 |
| | 0,1,1 | 0.002 | -3 | -3 | -3 | (1,1,1) | 4 | 1500 | 125 | 1050 |
| | 1,1,0 | 0.25 | 0 | 0 | 0 | (2,1,1) | 0 | 750 | 125 | 115 |
| | 1,0,1 | 0.116 | 0 | 0 | 0 | (1,2,1) | 1 | 500 | 175 | 110 |
| | 1,1,0 | 0.1 | -5 | -5 | -5 | (2,2,2) | 5 | 600 | 125 | 75 |
| | 0,0,2 | 0.37 | 0 | 0 | 0 | (0,0,0) | 2 | 80 | 150 | 11 |

FIG. 3

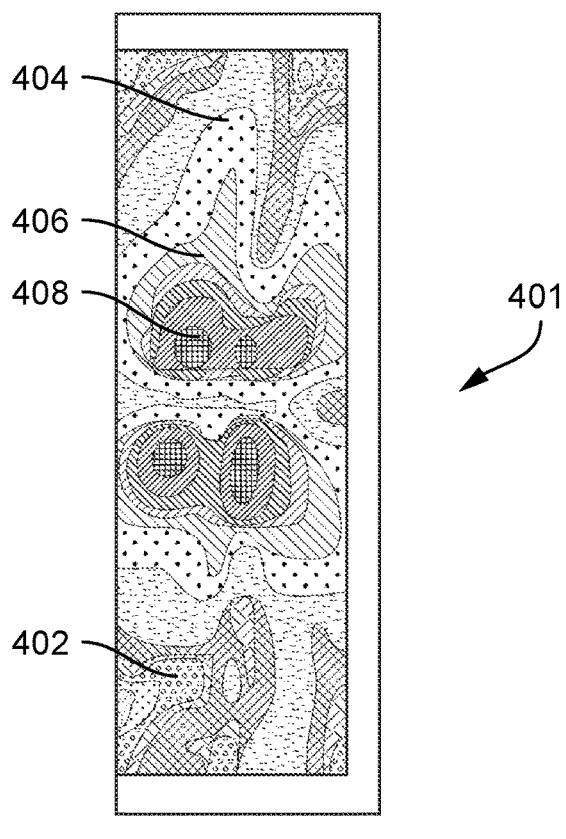
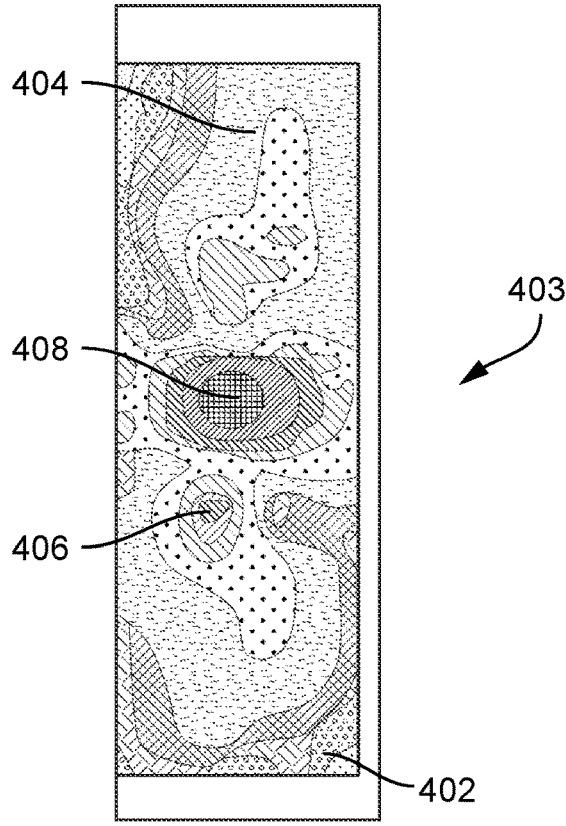
FIG. 4

| First Shielding Geometry (dB) | 5μm of electrical conductor (602) | 5μm of electrical/ magnetic conductors (604) | 5μm of thermal material (Graphene1) (606) | 5μm of thermal material (Graphene2) (608) | 5μm of thermal material (Graphene3) (610) | 5μm of thermal material / magnetic conductor (612) |
|---|---|---|---|---|---|---|
| Isolation @50 MHz | 79 | 80 | 39 | 57 | 47 | 49 |
| Isolation @100 MHz | 77 | 85 | 37 | 56 | 44 | 55 |
| Isolation @500 MHz | 75 | 75 | 30 | 45 | 40 | 51 |
| Isolation @1 GHz | 65 | 65 | 28 | 51 | 38 | 49 |
| Isolation @2 GHz | 50 | 51.5 | 23 | 45 | 42 | 42 |
| Isolation @3 GHz | 38 | 37.5 | 15 | 36 | 25 | 30 |
| Isolation @4 GHz | 25 | 26 | 11 | 28 | 22 | 22 |
| Isolation @5 GHz | 23 | 23.5 | 18 | 26 | 39 | 21.5 |
| Isolation @6 GHz | 20 | 21.5 | 18 | 20 | 20 | 22.2 |
| Isolation @7 GHz | 20 | 20 | 18 | 19 | 18.5 | 20 |
| Isolation @8 GHz | 7 | 7 | 8 | 7 | 7 | 7 |
| Isolation @9 GHz | 12 | 12.5 | 16 | 12 | 14 | 12 |
| Isolation @10 GHz | 13 | 13 | 16 | 14 | 14 | 13 |
| Isolation @11 GHz | 14 | 14.5 | 18 | 14 | 15 | 14 |
| Isolation @12 GHz | 17 | 17.5 | 19 | 18 | 18 | 18 |
| Isolation @12.7 GHz | 17 | 17 | 17 | 16 | 17 | 17 |

FIG. 6

| Second Shielding Geometry (dB) | 5μm of electrical conductor | 5μm of electrical/ magnetic conductors | 5μm of thermal material (Graphene1) | 5μm of thermal material (Graphene2) | 5μm of thermal material (Graphene3) | 5μm of thermal material / magnetic conductor |
|---|---|---|---|---|---|---|
| Isolation @50 MHz | 90 | 89 | 51 | 61 | 53 | 51 |
| Isolation @100 MHz | 84 | 97 | 44 | 60 | 50 | 56 |
| Isolation @500 MHz | 93 | 95 | 30 | 58 | 45 | 61 |
| Isolation @1 GHz | 90 | 92 | 23 | 56 | 42 | 54 |
| Isolation @2 GHz | 83 | 86 | 27 | 50 | 36 | 48 |
| Isolation @3 GHz | 75 | 77 | 19 | 42 | 29 | 49 |
| Isolation @4 GHz | 74 | 74 | 27 | 40 | 27 | 39 |
| Isolation @5 GHz | 82 | 82 | 27 | 50 | 36 | 47 |
| Isolation @6 GHz | 90 | 90 | 36 | 57 | 44 | 55.5 |
| Isolation @7 GHz | 100 | 98 | 40 | 65 | 51 | 62 |
| Isolation @8 GHz | 81 | 87 | 28 | 50 | 37 | 44 |
| Isolation @9 GHz | 82 | 85 | 27 | 48 | 35 | 47 |
| Isolation @10 GHz | 77 | 78 | 22 | 43 | 30 | 41 |
| Isolation @11 GHz | 77 | 80 | 27 | 44 | 32 | 44 |
| Isolation @12 GHz | 77 | 82 | 34 | 43 | 36 | 45 |
| Isolation @12.7 GHz | 67 | 77 | 34 | 36 | 31 | 42 |

FIG. 7

METHOD AND SYSTEM FOR INTELLIGENT SELECTIVITY OF MATERIAL APPLICATION

CROSS-REFERENCES TO RELATED APPLICATIONS

This application claims the benefit of Provisional U.S. Patent Application No. 63/213,553, filed Jun. 22, 2021, entitled "METHOD AND SYSTEM FOR INTELLIGENT SELECTIVITY OF MATERIAL APPLICATION," the entire disclosure of which is hereby incorporated by reference, for all purposes, as if fully set forth herein.

TECHNICAL FIELD

This disclosure generally relates to methods and systems for providing electromagnetic shielding and thermal materials to electronic devices. More specifically, this disclosure describes techniques for choosing and selectively layering materials on an electronic device to provide protection from electromagnetic interference, enhance security, and achieve predetermined thresholds of thermal performance.

BACKGROUND OF THE INVENTION

Electronic devices may require electromagnetic shielding for reasons such as security, noise mitigation, and protection from interference. As electromagnetic shielding may be provided for a variety of reasons, the materials used for a particular reason may not be suitable for another reason. Additionally, various thermal properties may be of concern on these electronic devices, which may require yet another material.

BRIEF SUMMARY OF THE INVENTION

In some embodiments, a method for applying materials to an electronic device may include generating an electromagnetic (EM) map of the electronic device. The EM map may indicate locations of EM radiation emitted from the electronic device. The method may also include generating a thermal map of the electronic device that may indicate locations of thermal energy emitted from the electronic device. The method may also include generating a shielding map from the EM map and the thermal map. The shielding map may include instructions to control a shielding apparatus, including locations on the electronic device to apply an EM shielding material and locations to apply a thermal material. The method may also include controlling a shielding apparatus to apply the EM shielding material and thermal material to the electronic device, according to the shielding map.

In some embodiments, a non-transitory computer-readable medium includes instructions that cause one or more processors to perform operations. The operations may include receiving an EM map of an electronic device that indicates location of EM radiation generated on the electronic device. The operations may also include receiving a thermal map of an electronic device that indicates locations of thermal energy generated on the electronic device. The operations may also include generating a shielding map, from the EM map and the thermal map that includes instructions to control a shielding apparatus. The shielding map may include locations on the electronic device to apply an EM shielding material and/or a thermal material. The operations may also include providing the shielding map to a shielding apparatus to apply the EM shielding material and/or the thermal material.

In some embodiments, a system may include a shielding apparatus that may deposit an EM shielding material and a thermal material on an electronic device. The system may include one or more processors and one or more memory devices. The memory devices may include instructions that cause the one or more processors to perform operations. The operations may include receiving an EM map of the electronic device that indicates locations of EM radiation generated from the electronic device. The operations may also include receiving a thermal map of the electronic device that indicates locations thermal energy generated on the electronic device. The operations may also include generating a shielding map, from the EM map and the thermal map that includes instructions to control a shielding apparatus. The shielding map may include locations on the electronic device to apply an EM shielding material and/or a thermal material. The operations may also include providing the shielding map to a shielding apparatus to apply the EM shielding material and/or the thermal material.

In some embodiments, generating the EM map may include simulating a model of the electronic device to measure EM radiation. Generating the EM map may also include determining locations of EM radiation on the electronic device and creating a mapping of the locations. Generating the EM map may also include determining EM shielding materials to be applied at location on the EM shielding device. In some embodiments, generating the EM map may include generating a model of the electronic device. Generating the EM map may also include identifying locations on the electronic device that are vulnerable to EM attacks, such as unintentional antennas.

In all embodiments, generating the thermal map may also include simulating a model of the electronic device to measure the thermal behavior of the electronic device. Generating the thermal map may also include determining locations of thermal energy on the electronic device and creating a heat map of the electronic device. Generating the thermal map may further include determining thermal materials to be applied at locations on the electronic device.

In some embodiments, generating the EM map and thermal map may include receiving data from probing a prototype of the electronic device. Generating the EM map and thermal map may also include receiving data from an EM scan and/or a thermal scan of the prototype. Generating the EM map and thermal map may also include creating a map of the location of EM radiation on the electronic device and creating a heat map of the electronic device. The EM map and thermal map may also include (x,y,z) coordinates.

In all embodiments, the shielding apparatus may apply the EM shielding material and the thermal material via sputtering and/or electroplating. The shielding apparatus may deposit at least one layer of EM shielding material to a shielding depth, as a function of a wavelength of EM radiation. The shielding apparatus may deposit a layer of thermal material to a material depth. The EM shielding material may include a layer of Cu for high frequency EM shielding and a layer of NiFe for low frequency shielding. The EM shielding material may include an alloy to provide shielding against high and low frequency EM radiation to within a predetermined threshold. The electronic device may include one or more integrated circuit packages mounted on a substrate made of glass or an organic material.

BRIEF DESCRIPTION OF THE DRAWINGS

FIG. 3 illustrates a lookup table (LUT) which may be used to correlate parameters with coordinates on the model, according to some embodiments.

FIG. 4 illustrates an example of a map of EM radiation emitted by a model of an electronic device, according to some embodiments.

FIG. 6 illustrates a data table that may be used to select a material based on the combined shielding map, according to some embodiments.

FIG. 7 illustrates a data table that may be used to select a material for a specific geometric shape of the shielding, according to some embodiments.

DETAILED DESCRIPTION OF THE INVENTION

Figure 1A:
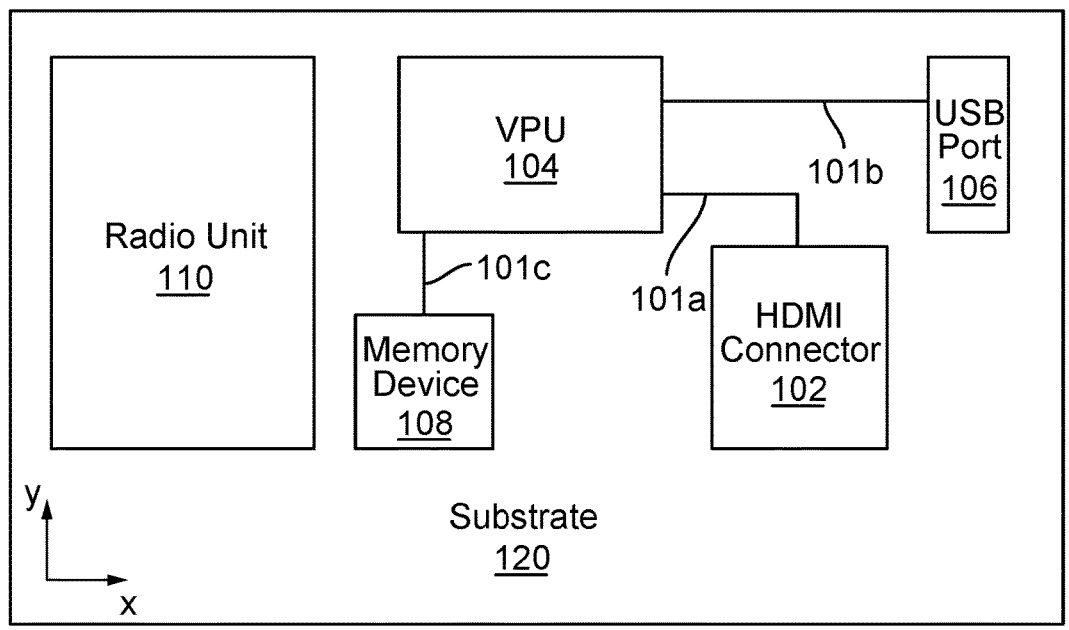
FIG. 1A illustrates an example of an electronic device wherein various components may emit electromagnetic (EM) radiation, according to some embodiments.

Electronic systems face challenges in mitigating factors such as thermal performance, noise, electromagnetic interference (EMI), and security. EMI can disrupt components included in the electronic device, whether the EMI comes from other components included in the same device or some other external source. Electromagnetic noise (sometimes referred to as "noise") can have a similar effect on components of the electronic device. Furthermore, noise can lead to security concerns. Leaked noise from an electronics device can sometimes be exploited in a side channel attack. The noise may be from a component purposefully carrying information within the device or may be from an unintended antenna. Effective electromagnetic shielding may therefore be necessary to protect an electronic device from EMI and to enhance security. Additionally, heat management of an electronic device may be of concern for processors and other advanced electronics. However, materials that provide optimal thermal properties may be poor choices for EM shielding. Likewise, appropriate materials for EM shielding may have poor thermal properties. Therefore, there is a need to selectively apply materials to various areas of an electronic device in order to achieve appropriate EM shielding and thermal properties.

Embodiments described herein selectively apply EM shielding materials and/or thermal materials to solve these problems. Locations may be identified on an electronic device that require EM shielding at certain frequencies. Similarly, the thermal properties of locations on an electronic device may be identified. By combining the locations on the electronic device that may need EM shielding and those that may require thermal materials to conduct heat away from the electronics, a shielding map may be generated that may control a shielding apparatus to apply varying materials selectively to an electronic device.

Electronic devices and the components can both emit and receive unwanted electromagnetic (EM) radiation. When electronic devices include antennas that broadcast information through radio waves or other forms of EM radiation, the unintentional reception or emission of EM radiation may cause problems with the integrity of a message to be sent or received.

Electromagnetic interference (EMI) occurs when an external emitter of EM radiation affects an electronic device though various means, including induction, conduction, or electrostatic coupling. EMI may prevent signals from being broadcast or received by an electronic device or may interfere with other circuitry in the electronic device. Therefore, a device may require shielding against EMI to protect the electronic device from being disturbed by EMI and/or to limit the electronic device's ability to interfere with other nearby electronic devices.

Noise is generated by electronic devices and/or their components. A common type of noise is thermal noise. Thermal noise is caused by the excitation of charge carriers within components of an electronic device. This noise may cause components of an electronic device to emit EM radiation within a certain frequency band. Noise generated by the components from the electronic device itself may have unwanted effects on other components of an electronic device, especially receiving components.

One of the possible effects may be referred to as desense, which is the reduction of sensitivity of a receiving component to receive an intended signal caused by noise from the receiving device itself. The noise need not be the same EM frequency as the intended signal. As desense reduces a device's ability to receive a signal, the electronic device's normal operation may be impacted, as it may no longer be operable to receive a signal at the intended frequency. The electronic device may experience packet loss when even momentary losses of signal reception occur, thus decreasing throughput and data rates while also decreasing range.

Noise may also be a security risk to the electronic device and any data being processed by the electronic device. "Side-channel attacks" encompass various methods of exploiting noise generated from an electronic device to gain access to information being transmitted or to control the device itself. By receiving the unintentional EM radiation generated by various components, including pathways such as traces, an attacker may be able to obtain cryptographic keys, intercept messages, or gain control over an electronic device.

In side-channel attacks, an attacker may scan a device looking for noise being generated by one or more components of the targeted device. After identifying a certain signal emitted as EM radiation as noise from a certain component, an analysis may be performed on the signal. Through various techniques, data may be extracted and subsequently decoded. In some cases, this the interception of cryptographic messages, or the data may lead to the electronic device itself being compromised in other ways.

FIG. 1A illustrates an example of an electronic device wherein various components may emit unwanted EM radiation, according to some embodiments. FIG. 1A may represent only portions of a larger device, for example, showing only the wireless and display modules of a larger system. FIG. 1A is provided only as an example and is not meant to be limiting; other electronic devices referred to herein may have all, some, or none of the components shown on FIG. 1.

A High-Definition Multimedia Interface (HDMI) connector 102 may be connected to a Visual Processing Unit (MAIN PROCESSOR) 104 via a trace 101a on a substrate 120. A Universal Serial Bus (USB) port 106 and a memory device 108 may be similarly connected to a MAIN PROCESSOR 104 through the traces 101b and 101c. Although not connected directly to the MAIN PROCESSOR 104, a radio unit 110 may be mounted on the substrate 120. The radio unit 110 may be used to send and receive data via radio waves, which may be a source of EM radiation or interference.

The USB port 106, the HDMI connector 102, and the memory device 108 may emit EM radiation as noise, as discussed above. In some instances, the noise emitted by these components may be the same frequency. In other instances, the noise emitted by each component may be different from the frequency emitted by any of the other components.

Figure 1B:
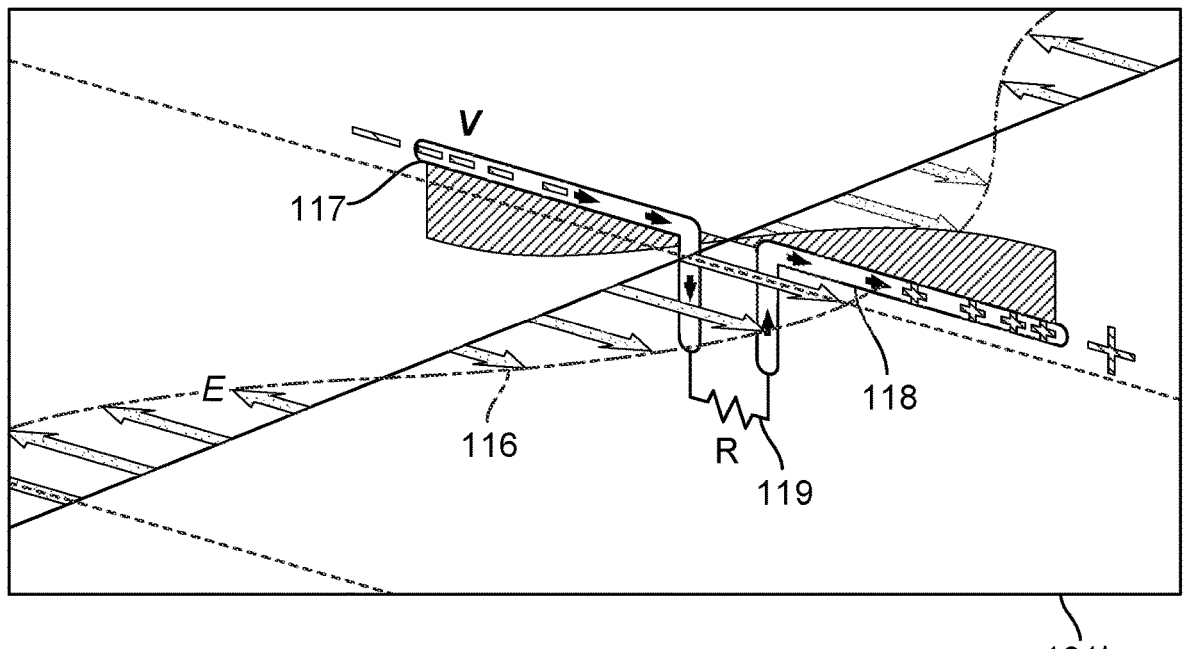
FIG. 1B illustrates a view of the trace 101b, which may include an unintentional antenna, according to some embodiments.

FIG. 1B illustrates a view of the trace 101b, which may include an unintentional antenna, according to some embodiments. While the trace 101b is shown as an example, any trace may act as an antenna. Additionally, the substrate 120 may have additional traces (not shown) that may also act as an unintentional antenna. A radio wave 116 is shown as an electromagnetic field. In some embodiments, the radio wave 116 may be emitted by the electronic device 100 via the radio unit 110. A first trace arm 117 and a second trace arm 118 are shown to be of equal length, approximately one-half of the wavelength of the radio wave 116. The first trace arm 117 and the second trace arm 118 are joined by a resistor 119, where the length of the resistor 119 is significantly smaller than the length of the first trace arm 117 and the second trace arm 118. On some electronic devices, the first trace arm 117 and the second trace arm 118 may be different segments of the same trace connected by some component. The first trace arm 117 and the second trace arm 118 may be portions of separate traces connected either intentionally or unintentionally by an interposer layer or component.

As the trace 101b is an electrical conductor, both the first trace arm 117 and the second trace arm 118 are also conductors. As the radio wave 116 interacts with the first trace arm 117 and the second trace arm 118, a voltage is created across the length of both trace arms. As the radio wave 116 oscillates, the voltage across the first trace arm 117 and the second trace arm 118 oscillates at the same frequency. Because there is a voltage across the length of the trace arms and they are connected by a resistor, current flows back and forth, and noise may be generated, oscillating at or near the same frequency as radio wave 116. Thus, the trace 101b acts as an unintentional antenna broadcasting radio wave 116. This configuration is not the only possible configuration of an unintentional antenna. One of ordinary skill in the art would recognize many different configurations that may allow the radio wave 116 being broadcast unintentionally.

One way to mitigate EMI and noise may be to shield "noisy" components, limiting their unintended emission of EM radiation to be below a certain threshold. Similarly, unintentional antennas may also be mitigated by EM shielding. Electronic devices may include many noisy components, however, and there may be a need to shield against different frequencies of EM radiation at different locations on the same electronic device.

A material may be chosen as an EM shield material for a specific noisy component based on the frequency of EM radiation it emits. In some embodiments, different EM shielding materials may be selected to shield against different frequencies of EM radiation in different areas. Additionally, EM shielding materials may be applied at different depths or thicknesses in order to attenuate unwanted EM radiation to be below a certain threshold. However, the thermal performance of the electronic device may be affected by the application of an EM shielding material.

Figure 2:
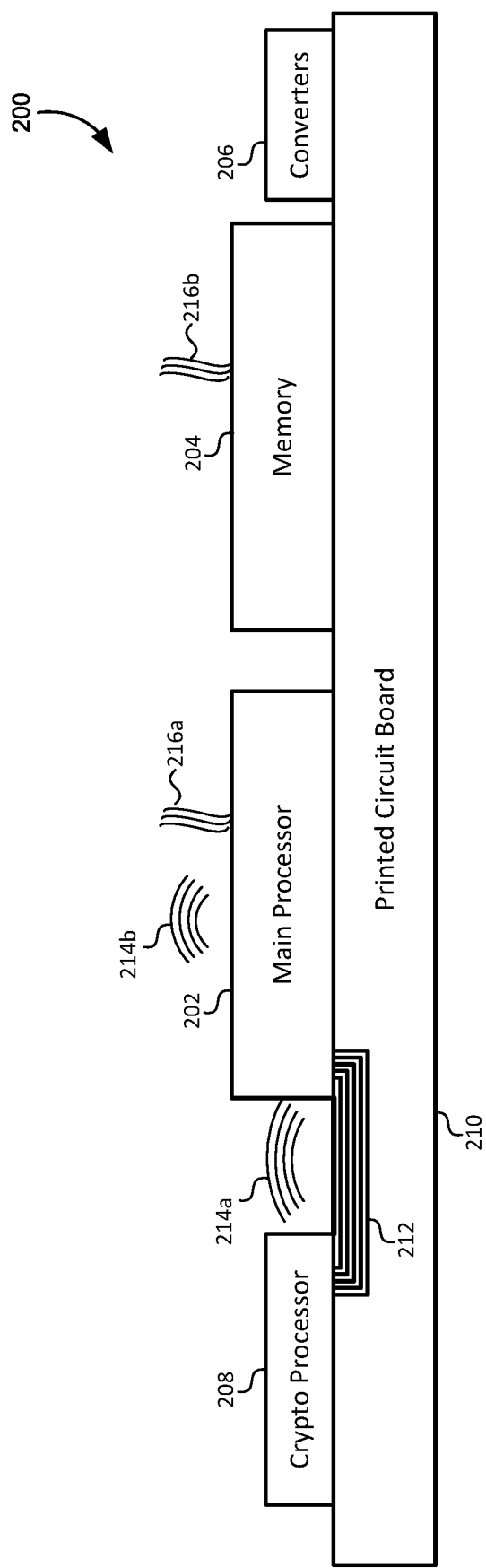
FIG. 2 illustrates an electronic device emitting EM radiation and thermal energy, according to some embodiments.

FIG. 2 illustrates an electronic device 200 emitting EM radiation and thermal energy, according to some embodiments. Electronic device 200 shows example components that may be mounted on a substrate 210. The substrate 210 may be a printed circuit board, a silicon substrate, an interposer layer, and/or any other type of substrate upon which integrated circuits can be mounted. A cryptographic processor 208 may be connected via traces 212 to a main processor 202. A memory 204 and one or more converters 206 may also mounted on substrate 210. While memory 204 and converters 206 are not shown being connected to any other component, one of ordinary skill in the art would recognize that these components may be connected to any or all of the other components shown via internal or hidden traces.

In order to perform a cryptographic operation, the main processor 202 may retrieve cryptographic keys that are generated by the cryptographic processor 208. The cryptographic processor 208 may transmit the cryptographic keys to the main processor 202 through the traces 212 that run between the cryptographic processor 208 and the main processor 202 through the substrate 210. As illustrated in FIG. 2, these traces may be exposed and/or otherwise vulnerable to a physical attack. For example, traces that are on a surface level of the substrate 210 may be probed using a voltage probe or other sensor (not shown). For traces that run on internal layers of the substrate 210, a skilled attacker may carefully remove portions of the substrate 210 to expose these traces. Because the traces 212 run between the cryptographic processor 208 and the main processor 202, they are vulnerable to such an attack.

In other embodiments, such as is shown in FIG. 1, the trace 212 may emit unwanted EM radiation 214a due to being an unintentional antenna. The device in FIG. 2 may be part of a larger system, not shown, including a wireless radio transmitter, such as the radio unit 110. The unwanted EM radiation 214a may be the signal being broadcast by the wireless radio transmitter. To attenuate the unwanted EM radiation 214a, a first EM shielding material may be needed which is selected based on the frequency of the unwanted EM radiation 214a.

The main processor 202 may emit EM noise 214b. The EM noise 214b and the unwanted EM radiation 214a may be EM radiation of the same frequency or of different frequencies. A second EM shielding material may therefore be needed to properly attenuate the EM noise 214b. In some embodiments, the second EM shielding material may be the same as the first EM shielding material. The second EM shielding may also be a different material than the first EM shielding material.

The main processor 202 may also be radiating thermal energy 216a. Applying the second EM shielding material may affect the thermal behavior of the main processor 202 by not allowing the thermal energy 216a to be dissipated properly. The depth of the second EM shielding material may also affect the dissipation of the thermal energy 216a. The main processor 202 may also, therefore, need a thermal material applied to dissipate the thermal energy 216a, thereby allowing the thermal properties of the main processor 202 to remain within a predetermined threshold. In some embodiments, a depth of a thermal material and a depth of the second EM shielding material may be determined such that the noise 214b and the thermal energy 216a are kept within a predetermined threshold.

Likewise, the memory 204 may radiate thermal energy 216b. In some embodiments, the thermal energy 216b may be comparable to the thermal energy 216a, thus requiring a comparable depth of thermal material. In other embodiments, the magnitude of the thermal energy 216b may be different than that of the thermal energy 216a, thus requiring a different thickness of a thermal material.

It should be understood that the components shown emitting EM radiation and thermal energy in FIG. 2 are only examples and are not meant to be limiting. Any of the components in FIG. 2 may emit thermal energy and/or EM radiation. Furthermore, although the embodiments in FIGS. 1 and 2 are shown as emitting EM radiation, the electronic devices 100, 200, and their associated components may benefit from EM shielding to prevent unwanted EM radiation from affecting the devices or their components. The unwanted EM radiation may come from other components on the same device or may come from an external source.

Similarly, the electronic devices 100 and 200 and their associated components may require that thermal energy be shielded rather than dissipated. The converters 206 may have narrow thermal threshold. A thermal material may be applied to the converters 206 in order to mitigate effects of the thermal energy 216b on the convertors 206. In some embodiments, the electronic device 200 may need to be shielded from external sources of thermal energy, while at the same time having localized areas where thermal energy may be dissipated or redirected.

FIGS. 1A-2 illustrate that different materials may need to be selectively applied to different locations on an electronic device. In some embodiments, locations may require one or more EM shielding materials or thermal materials. Identifying these locations after manufacture may be costly and inefficient, requiring multiple prototypes to be built and tested before the locations are properly identified and shielded. Thus, identifying locations to selectively apply EM shielding material or thermal material to an electronic device prior to manufacture may lead to greater efficiency in the design process while lowering cost.

In some embodiments, an electronic device may be modeled. A model may be generated and/or simulated by software running on a computing device. The model may include representations of integrated circuits, chiplets on a substrate, flip chip packages, or any other type of electronic device. The model may include a 3-D representation of the model.

The model may include information about the materials used in its fabrication and any included components. The model may describe a substrate material, such as glass, organic materials, or other suitable material. The model may also describe any number of components, including processors, volatile memory, non-volatile memory, clocks, I/O interfaces, or other suitable components. The model may include information about all characteristics of components included thereon, including operating voltages, currents, frequencies, tolerances, and other electronic information.

A coordinate map may be generated of the model. The coordinate map may be in two dimensions or the coordinate map may be in three dimensions. In some embodiments, the coordinate map includes (x, y, z) coordinates. The coordinate map may also include the location of components on the model.

The model may include expected thermal values of the electronic device and its components. Expected thermal values may include a Junction-to-Case coefficient ($\theta jc$), Coefficient of Thermal Expansion (CTE), Thermal Resistance (R), or other thermal properties. Different locations on the model may include different thermal values. These differences may be a function of a component of the model and/or of a material chosen for a substrate or other component. In some embodiments, the thermal values may be generated by a computing device or a user may enter the thermal values.

FIG. 3 illustrates a lookup table (LUT) 300 which may be used to correlate parameters with coordinates on the model, according to some embodiments. The LUT 300 may contain information including (x, y, z) coordinates of the model, known $\lambda/4$ points for known emitters at certain EM radiation frequencies, thermal R values, Junction-to-Case coefficients ($\theta jc$), and other information describing EM or thermal characteristics of the electronic device.

As discussed below, the LUT 300 may be updated iteratively to include information based of EM and thermal scans of the model. This information may include thermal radiation values, magnetic field strengths (magnetic components Hx, Hy, and Hz current densities—mA/mm2), S21 coupling (leakage energy—dB/mm) values, spectral values (spurious levels from spectral scan), S11 (return loss (dB) or impedance (ohms $\Omega$) of unwanted/undesired antennas, which helps determine the $\lambda/4$ (maxima) and $\lambda/10$ (minima) of radiation points for a given noise source and frequency of operation), and other relevant data for each location on the model. The LUT 300 may also include locations vulnerable to EM attacks, locations of unintentional antennas, and other information.

After the electronic device is modelled, a computing device may conduct a simulated operation of the model. In some embodiments, the simulated operation can include simulating the model using expected operating voltages and currents applied to various components of the modeled electronic device. The simulation may also use expected operating frequencies for components such as radio units or antennas. The simulation may include external factors such as EMI or thermal energy from external sources. These sources may be a result of other electronic devices within a larger system or from other nearby devices. The external factors may also include sources of thermal energy and EM radiation from a typical operating environment.

During the simulated operation of the model, the computing device may make simulated measurements of EM radiation at various locations on the electronic device via virtual scanning. During the simulation, the electronic device may be virtually scanned by the computing device. As discussed above, there may be multiple EM radiation frequencies emitted from various locations of an electronic device. Therefore, various locations of the model may be scanned for multiple frequencies. In some embodiments, high frequencies of EM radiation may be above 1 GHz. Low frequencies of EM radiation may be in the range of 100-800 MHz. Based on the results of the virtual scans, the computing device may virtually apply an EM shielding material to the model, then simulate operation and perform the virtual scans again to observe the simulated effect of the EM shielding material.

FIG. 4 illustrates an example of a map of EM radiation emitted by a model, generated by a computing device. An EM frequency map 400 shows simulated measurements of EM radiation at a certain frequency. The EM frequency map 400 may include measurements take along multiple orientations of a modeled electronic device such as a model of the electronic device described in FIG. 1. The Hx magnitude 401 may represent a simulated measurement of EM radiation propagating along the x-axis shown in FIG. 1. Accordingly, the Hy Magnitude 403 may represent a simulated measurement of EM radiation propagating along the y-axis shown in FIG. 1. In some embodiments, the EM frequency map 400 may include two orientations. In other embodiments, the EM frequency map 400 may include a third orientation, such as an Hz magnitude (not shown).

The EM frequency map 400 may be characterized by regions of higher magnitude EM radiation at a specified frequency. A first region 402 may represent an area of lower magnitude of EM radiation of the specified frequency. A second region 404 may have a higher magnitude of EM radiation of the specified frequency than the first region 402. In some embodiments, the magnitude of EM radiation at the specified frequency at the second region 404 may be below a predetermined threshold. In other embodiments, the second region 404 may be identified as a location that requires an EM shielding material for the specified frequency.

A third region 406 may have a higher magnitude of EM radiation of the specified frequency than second region 402. The computing device may identify the third region 406 as a location that requires an EM shielding material for the specified frequency. For example, the third region 406 may include an unintentional antenna. The third region 406 may also be identified by the computing device as a specific component.

A fourth region 408 may have an even higher magnitude of EM radiation of the specified frequency. The computing device may identify the fourth region 408 as a specific component of the model. In some embodiments, the specific component may be an intentional emitter of EM radiation, such as an antenna, and thus need not require EM shielding material for the specified frequency. In other embodiments, the specific component may emit unwanted EM radiation, and EM shielding material for the specified frequency may be used.

After simulating EM radiation on the electronic device, the computing device may determine locations on the electronic device that include resonant points. For example, the computing device may determine a location of an emitter of EM radiation at a certain frequency. The computing device may then identify multiple resonant points on the electronic device as distances from the emitter of EM radiation that are a multiple of $\lambda/4$, where X is the wavelength of the frequency. The computing device may register these areas in the LUT 300 and/or on map 400.

After simulating EM radiation on the electronic device, the computing device may calculate a location including an eddy current generated by the skin effect within a conductor included in the electronic device. The conductor may be a component, trace, and/or other electrically conductive material. The eddy current may be strong enough to dominate any intentional current in the conductor and emit EM radiation. The computing device may the determine that the location on the electronic device needs shielding due to the eddy current. The computing device may also identify distances from the location including an eddy current that are a multiple of $\lambda/4$, where $\lambda$ is the wavelength of the frequency being emitted due to the eddy current. The computing device may register these areas in the LUT 300 and/or the map 400.

The computing device may also determine other EM measurements during the simulated operation. Other EM measurements may include magnitudes of EM radiation at various frequencies, magnetic field strengths (magnetic components Hx, Hy, and Hz current densities—mA/mm2), S21 coupling (leakage energy—dB/mm) values, spectral values (spurious levels from spectral scan), S11 (return loss (dB) or impedance (ohms Ω) of unwanted/undesired antennas, which helps determine the $\lambda/4$ (maxima) and $\lambda/10$ (minima) of radiation points for a given noise source and frequency of operation), and other relevant data for each location on the model. The computing device may register these areas in the LUT 300 and on the EM frequency map 400.

The computing device may also identify a location on the model that may be vulnerable to EM attacks such as side-channel attacks. This location on the electronic device may include an unintentional antenna broadcasting EM radiation at a specified frequency. The location may also include a particular component of the electronic device that is vulnerable to EM attacks by EM radiation at a specified frequency. The computing device may register the location in the LUT 300 and/or on the EM frequency map 400. For example, the coordinates of the cryptographic processor 208 and the main processor 202, along with the traces 212 between these two components, may be identified by coordinates as requiring EM shielding to prevent the unintentional broadcasting of cryptographic material.

Multiple iterations of the EM frequency map 400 may be generated by the computing device for simulated measurements of different frequencies of EM radiation. In some embodiments, the iterations of the EM frequency map 400 may overlap with certain locations radiating across a band of EM radiation frequencies. In other embodiments, the iterations of the EM frequency map 400 may show varied magnitudes of EM radiation depending on the frequency measured. At each iteration, measurements may be taken again. This information may include, magnetic field strengths (magnetic components Hx, Hy, and Hz current densities—mA/mm2), S21 coupling (leakage energy—dB/mm) values, spectral values (spurious levels from spectral scan), S11 (return loss (dB) or impedance (ohms Ω) of unwanted/undesired antennas, which helps determine the $\lambda/4$ (maxima) and $\lambda/10$ (minima) of radiation points for a given noise source and frequency of operation n), and other EM data. The computing device may then register the measurements in the LUT 300 and/or on the EM frequency map 400.

The computing device may combine the iterations of the EM frequency map 400 into one EM map and update all measurements in the LUT 300. The computing device may then determine an EM shielding material and determine a shielding depth for each location on the electronic device based on the LUT 300.

Certain EM shielding materials may be suitable for high frequency EM shielding, such as Cu. Other EM shielding materials may be suitable for low frequency EM shielding, such as NiFe. An alloy may be suitable to provide high frequency shielding and low frequency shielding simultaneously. Suitable EM shielding materials may include Cu, NiFe, TiV, CoFe69, Ag, and Au. One or more EM shielding materials may be chosen. The materials in this list are not exhaustive and are provided only by way of example. One of ordinary skill in the art with the benefit of this disclosure would recognize many suitable materials which may be appropriate EM shielding materials.

Suitable EM shielding materials may be listed in a database, accessible by the computing device. The database may include information about each EM shielding material such as a shielding effectiveness at a given frequency of EM radiation, thermal properties, cost, and other information.

The computing device may determine one or more EM shielding materials in the database is appropriate for a given location by calculating and balancing the properties of a plurality of potential EM shielding materials. In some embodiments, a first potential EM material and a second potential EM material may be determined to effectively shield against a specific frequency of EM radiation. The computing device may then evaluate other factors associated with the first and second potential EM shielding materials. These factors may include permittivity, permeability, dielectric constant, loss tangent of the substrate, coefficient of thermal expansion (CTE) values, thermal R values, or other relevant factors.

The computing device may determine that a location on the model requires shielding against one or more frequencies of EM radiation based on the EM frequency map 400. The computing device may determine that the first EM shielding material and a second EM shielding material may be optimal to achieve EM performance to within a predetermined threshold while maintaining cost and other considerations within given parameters. In some embodiments, the computing device may determine that a first layer of first potential EM shielding material and a second layer of second potential EM shielding may be appropriate. The computing device may utilize criteria such as CTE-mismatch, relative magnetic permeability ($\mu r$), skin depth ($\delta$), and relative skin effect between the potential EM shielding layers. In some embodiments, a dielectric layer may be used between the first and second potential EM shielding layers.

In some embodiments the computing device may determine that an alloy listed in the database is a suitable EM shielding material. Alloys may have properties that allow for EM shielding against a wide band of EM frequencies. The computing device may determine that an alloy provides appropriate EM shielding over a band of EM frequencies and provides other benefits over layering multiple EM shielding materials.

The computing device may determine a shielding depth for each EM shielding material at every location on the model. The shielding depth may be determined in each orientation. In other words, the shielding depth may be a three-dimensional volume of material applied at a location on the model.

The shielding depth may be based on a shielding effectiveness (SE) of a potential EM shielding material, thermal properties of the EM shielding material, and other relevant criteria. The SE of a potential EM shielding material may be calculated to attenuate a certain frequency of EM radiation below a predetermined threshold. The computing device may determine that at least one EM shielding material applied to an associated shielding depth would attenuate the unwanted EM radiation to within a predetermined threshold. The SE of an EM shielding material may be compared with the thermal properties of the EM shielding material. A shielding depth may be determined which achieves the desired attenuation of the certain frequency while achieving a threshold of thermal performance at a certain location on the electronic device.

The computing device may determine locations on the model such as those described above for multiple frequencies. An EM shielding material may be determined for each location on the model, and the model may be updated for every frequency at every location. The computing device may run the simulated operation using the updated model. The process may be repeated until all simulated measurements of all scanned frequencies of EM radiation are below a predetermined threshold. Once all scanned frequencies are below a certain threshold, the computing device may combine the iterations of map 300, including information about the EM shielding materials and associated shielding depths, into a final EM map and/or update the LUT 300 accordingly.

The computing device may also generate a thermal map of the modeled electronic device. The computing device may generate the thermal map during the simulated operation of the electronic device, thus showing expected thermal behavior of various locations of the model. The computing device may make simulated measurements of temperature at every location of the model.

Figure 5:
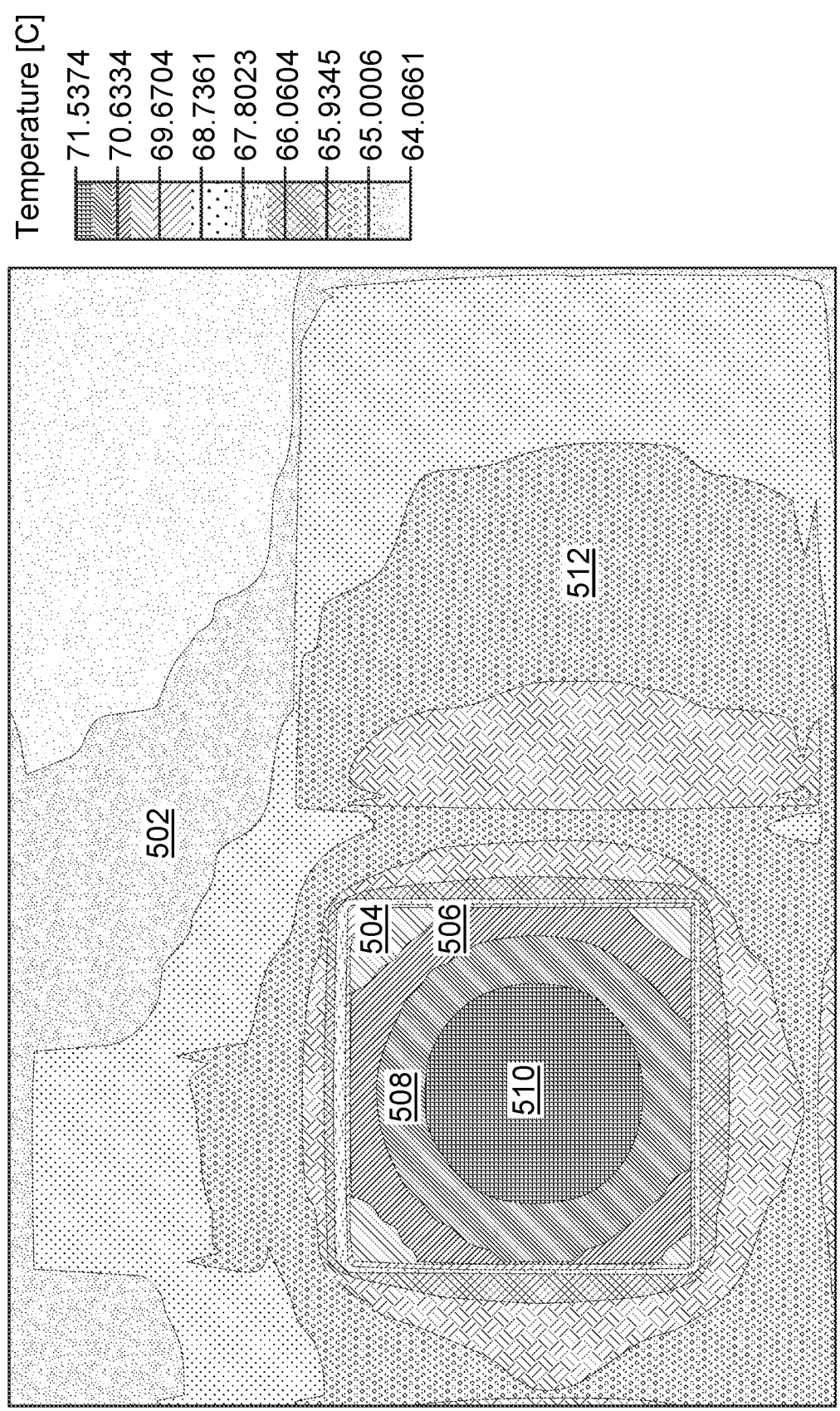
FIG. 5 illustrates a top-down heat map of thermal energy emitted by an electronic device, according to some embodiments.

FIG. 5 illustrates a top-down heat map of thermal energy emitted by an electronic device. The thermal map 500 may be a thermal map of an electronic device such as the one described in FIG. 1. While the thermal map 500 only shows one orientation of the model, other thermal maps may be generated from other orientations, such as from the x-axis and y-axis shown on FIG. 1.

During the simulated operation of the model the computing device may take simulated measurements of thermal energy on the model. The computing device may then generate the thermal map 500 of the model, characterizing multiple regions of the model by temperature. The regions of the thermal map 500 may be denoted by color or other visual aid. The regions of the thermal map 500 may also be labeled with a temperature or range of temperatures. The regions may also be represented in a chart or table.

A first region 502 may be characterized by a lower temperature, indicating low thermal activity. The first region 502 may, therefore, be below a certain temperature threshold. In relation to the first region 502, a second region 504 may be an area of higher temperature. Similarly, a third region 506 may be a location of even higher temperature. Fourth and fifth regions 508 and 510 may be locations of even greater temperature, which may be above a temperature threshold and require the application of thermal material.

The computing device may correlate the thermal map 500 to the coordinate map of the model and/or update the LUT 300 accordingly. The computing device may then determine a thermal material and determine a material depth for each location on the electronic device. The material depth may be determined in each orientation. In other words, the material depth can be a three-dimensional volume of material applied at a location on the model.

The computing device may also determine a location on the backside of the electronic device that requires Backside Metallization (BSM). The location may require BSM to improve thermal performance and/or to improve electrical connectivity. In some embodiments, the computing device may determine that the entire electronic device requires BSM. In other embodiments, BSM may be applied selectively. The computing device may determine a material depth for BSM at each location on the electronic device.

The material depth may be determined based on a predetermined threshold of thermal performance. Thresholds for thermal performance may include heat conduction, absorption, or radiation. Various suitable thermal materials may include graphene, graphite, Ag, Cu, Au, CuZn, Ti, NiV, and Al. Alloys of one or more thermal materials may also be suitable thermal materials. This list is not exhaustive and is not meant to be limiting. Various suitable materials may be contained in a database of thermal materials, accessible by the computing device to achieve one or more predetermined thresholds of thermal performance.

The database of thermal materials may include EM properties of the thermal material. The computing device may select a thermal material based on one or more of the properties contained in the database of thermal materials. Furthermore, various locations of the modeled electronic device may include varying thresholds of thermal performance and thus require the application of varying thermal materials to varying material depths.

For example, in some embodiments, the computing device may determine a large difference in simulated measurements of thermal temperature between regions, similar to the difference between the first region 502 and the second region 504. The computing device may then determine that because higher temperatures are found within the second region 504 (such as regions 506-510), the border between the first region 502 and the second region 504 may include a component such as the main processor 104 in FIG. 1 or the main processor 202 in FIG. 2.

The computing device may determine that a thermal material is needed to conduct heat away from the fifth region 510. The computing device may further determine that a heat sink may be formed in the first region 502 due to low thermal activity, location on the model, and other parameters. The computing device then may determine one or more thermal materials to apply to the regions 502-510, such that heat is conducted away from the fifth region 510 and radiated via a heat sink or other structure in the first region 502. The computing device may update the model and/or the LUT 300 with the thermal material and run the simulated operation again. This process may occur until all locations on the model are below a predetermined threshold for thermal performance.

A structure 512 may be a component recognized by the computing device in a previous simulated operation of the model. During the previous operation, the computing device may have determined that the structure 512 was a specific component of the model. The computing device may have also determined that the thermal energy radiating from the regions 504-510 are above a predetermined threshold for thermal performance, affecting the operability of the structure 512. The computing device may have then determined a thermal material to act as a heat shield and selectively applied the thermal material to the location on the electronic device, including the structure 512, at a material depth such that the structure 512 achieved a threshold for thermal performance. The computing device may have updated the model and/or the LUT 300. The computing device may then run the simulated operation again.

The computing device may run simulated operations and update the model and/or the LUT 300 iteratively until every location on the model is correlated with a thermal material and material depth such that every location on the model achieves a predetermined threshold of thermal performance. This process may be repeated by the computing device, generating an iteration of the thermal map 500 and/or updating the LUT 300 at the end of each process until all locations of the model achieve a threshold of thermal performance. The computing device may combine the iterations of the thermal map 500, including information about the thermal materials and associated material depths into a final thermal map and/or update the LUT 300.

The model may be updated with the final thermal map and the final EM map, and the LUT 300, including locations of EM shielding materials, associated shielding depths, thermal materials, and material depths. A prototype of the electronic device may then be fabricated. The prototype may include all of the components incorporated in the model. The prototype may then have EM shielding materials applied to a shielding depth by a shielding apparatus according to the final EM map. Similarly, the prototype may have thermal materials applied to a material depth by a shielding apparatus according to the final thermal map. The shielding apparatus may include an apparatus operable to deposit materials by electroplating. The shielding apparatus may also include an apparatus operable to deposit materials through sputtering, as described below.

After the prototype has been fabricated, the EM shielding materials applied to a shielding depth, and the thermal materials applied to a material depth, further testing may occur. During further testing, the prototype is run according to normal operations. Normal operations may include expected operating voltages and currents applied to various components of the prototype. This may also include intentional emission of EM radiation at operating frequencies by components such as radio units or antennas. Further testing may also include subjecting the prototype to simulated conditions, such as external heat sources or EMI.

During further testing, the final EM map may be verified. A coordinate map of the prototype may be generated and verified with the coordinate map of the model. An EM scan may be performed on the prototype and measurements may be taken of any EM radiation being emitted from the prototype, as well as other measurements as registered in the LUT 300. The EM scan may be done by a computing device. The scan may examine each location of the prototype and measure the magnitude of the EM radiation emitted by the prototype at that location. Multiple scans may be performed over multiple frequencies of EM radiation, and may measure other EM parameters such as magnitudes of EM radiation at various frequencies, magnetic field strengths (magnetic components Hx, Hy, and Hz current densities—mA/mm2), S21 coupling (leakage energy—dB/mm) values, spectral values (spurious levels from spectral scan), S11 (return loss (dB) or impedance (ohms $\Omega$) of unwanted/undesired antennas, which helps determine the $\lambda/4$ (maxima) and $\lambda/10$ (minima) of radiation points for a given noise source and frequency of operation), and other information about EM characteristics of the prototype.

The EM scans may then be combined and compared to the coordinate map of the EM map of the prototype showing the magnitudes of multiple frequencies of EM radiation and other EM parameters at all locations on the prototype. The EM map of the prototype may be compared to the final EM map. If discrepancies are found between the EM map of the prototype and the final EM map of the simulation, the EM scan may be repeated. The simulated operation of the model may also be repeated and the EM frequency map 400 and/or the LUT 300 may be updated with the results of the EM scan. Once the EM map of the prototype is verified with the final EM map, the final EM map may be exported into a shield map.

Also during further testing, thermal scans may be performed on the prototype. Temperature measurements may be taken, measuring thermal energy emitted at all locations of the prototype. The thermal scan may be performed by a computing device with a thermal imaging apparatus. The result of the thermal scan is then correlated with the coordinate map of the prototype, creating a thermal map of the prototype. The thermal map may then be compared to the final thermal map. If discrepancies between the thermal map of the prototype and the final thermal map are found, the thermal scan may be repeated. The simulated operation of the model may also be repeated and the thermal map 500 and/or the LUT 300 may be updated with the results of the thermal scan. Once the thermal map of the prototype is verified with the final thermal map, the final thermal map may be exported into a shielding map.

The final thermal map and the final EM map may be combined into a shielding map. In some embodiments, the LUT 300 may be combined with the final thermal map and the final EM map to generate the shielding map. The shielding map may include a coordinate map of the model or information about EM radiation emitted from the electronic device, such as magnetic field strengths (magnetic components Hx, Hy and Hz current densities—mA/mm2), S21 coupling (leakage energy—dB/mm) values, spectral values (spurious levels from spectral scan), S11 (return loss (dB) or impedance (ohms Ω) of unwanted/undesired antennas, which helps determine the λ/4 (maxima) and λ/10 (minima) of radiation points for a given noise source and frequency of operation), and other relevant EM data. The shielding map may also include thermal data, such as Coefficient of Thermal Expansion (CTE), thermal resistance (R), junction to case thermal resistance (θjc), and other relevant thermal data.

The shielding map may also include data, including EM shielding materials and associated shielding depths for every location on the electronic device. The shielding depths for each EM shielding material may be identical for all locations on the electronic device or may be varied at each location on the electronic device based on factors such as the frequency of the corresponding EM radiation, the strength of the corresponding EM radiation, the type of information included in the EM radiation, and/or other characteristics of the EM radiation or the component generating the EM radiation.

Similarly, the shielding map may include data about thermal materials and associated material depths for every location on the electronic device. The material depths for each thermal material may be identical for all locations on the electronic device or may be varied at each location on the electronic device based on factors such as the amount of thermal energy generated at each location, the sensitivity of surrounding components, the proximity to heatsinks and other thermal conductors, and/or other characteristics of the thermal energy or the component generating the thermal energy.

As described above, the final shielding map may include materials that are applied to provide EM shielding, along with materials that are applied to provide dissipation of thermal energy. In some embodiments, these materials may be applied separately as alternating layers over the electronic components on the electronic device. In other embodiments, materials may be selected that provide both EM shielding and thermal dissipation properties. Thus, a single material or alternating layers of materials may be deposited on the electronic device to provide both the EM shielding and thermal dissipation as specified for the design.

FIG. 6 illustrates a data table 600 that may be used to select a material based on the combined shielding map, according to some embodiments. In this example, the shielding effectiveness or isolation may be stored for a plurality of different shielding material configurations. Additionally, the shielding effectiveness (e.g., measured in dBs) for each material may be stored at different frequencies that may be present in the EM map. For example, the shielding map may include a strength of the EM emission and/or a frequency associated with the EM emission. Different shielding thicknesses and/or materials may have varying effectiveness at different operating frequencies.

In this example, five different materials are presented as options in the data table 600. However, it should be understood that the data table 600 may include many different materials, layers, and/or material configurations that are not specifically listed in the data table 600. Therefore, the materials described in the data table 600 are provided only by way of example as to how materials may be selected, and they are not meant to be limiting.

Column 602 includes the shielding effectiveness of an electrical conductor having a specified thickness, such as a 5 μm layer of Cu. This column may be used when the shielding map specifies a region that primarily requires EM shielding. The specified operating frequency may be used as an input to the data table 600 in order to identify a type and/or thickness of conductor that may be used as a shielding layer to provide the specified EM shielding. For example, if the operating frequency is approximately 2 GHz and an isolation of at least 75 dB is specified by the design, the column 602 indicates that the 5 μm layer of Cu will provide an adequate level shielding effectiveness (e.g., 83 dB). Other columns in the data table 600 may also be compared to the column 602 in order to identify other materials and/or thicknesses that may perform better. For example, multiple columns representing different conductive materials with varying thicknesses may be compared to identify the maximum shielding effectiveness available for the given frequency, within a shielding thickness range for the design.

Column 604 illustrates a different configuration for providing EM shielding. Specifically, alternating 5 μm layers of an electrical conductor and a magnetic conductor may be used to provide EM shielding. For example, alternating layers of Cu and a cobalt alloy (e.g., CoNiFe) may be stored and compared to other alternatives in the data table 600 as described above. Note that these materials are provided only by way of example and are not meant to be limiting. Other entries in the data table 600 may include other electrical conductor and magnetic conductor combinations using different materials with similar properties. For example, other magnetic conductors may be used with a high ferromagnetic resonance (FMR). The alternating electrical/magnetic conductors may provide a high level of EM shielding, particularly at lower frequencies. As frequency increases, the preference may shift from the electrical/magnetic conductor layers to a single conductor layer in column 602. A multilayer stack of alternating electrical conductors and magnetic conductors may provide additional improvements in shielding effectiveness due to multi-reflections between the heterogeneous impedances of the material layers.

Columns 606, 608, 610 illustrate materials that are primarily used provide thermal dissipation. The data table 600 may store their EM shielding effectiveness when used to dissipate thermal energy. For areas in the shielding map that indicate a high level of thermal energy and lesser levels of EM emissions, material such as graphene[1/2/3] may be used as shielding materials. In some embodiments, different combinations of thermal materials and EM shielding materials may be used as alternating layers to provide adjustable levels of EM shielding and thermal dissipation. For example, column 612 illustrates the shielding effectiveness of alternating 5 μm layers of thermal materials (e.g., graphene) and magnetic conductors (e.g., CoNiFe). Higher frequencies may benefit from alternating layers of thermal materials and electrical conductors. The process described above may be used to identify a material or combination of materials in the data table 600 that matches the thermal and EM requirements from the shielding map.

FIG. 7 illustrates a data table 700 that may be used to select a material for a specific geometric shape of the shielding, according to some embodiments. In addition to the type of shielding material used, the geometric configuration or shape of the shielding material may also directly affect the level of shielding effectiveness and thermal dissipation. For example, the data table 600 in FIG. 6 may include data for a first shielding configuration (e.g., a shielding shape that covers the top and/or sides of the electronic component). The data table 700 in FIG. 7 may include data for a second shielding configuration (e.g., a shielding shape that completely encloses an electronic component on the electronic device). Thus, in addition to selecting a material combination and a thickness from the data tables 600, 700, some embodiments may also determine a geometric shape or configuration for the shielding materials for different areas on the electronic device.

The shielding map may be provided to a shielding apparatus. The shielding apparatus may be operable to receive the shielding map via USB, WiFi, Ethernet, EtherCAT, or other suitable communication methods. A computing device having one or more processors may be included in the shielding apparatus, operable to control the application of materials onto an electronic device. The computing device may also include one or more memory devices. The shielding map may include commands, that when read by the computing device, control the shielding apparatus to deposit material onto the electronic device. The shielding apparatus may be operable to apply materials to dies, wafers, or other substrates that may include integrated circuit (IC) packages, chiplet assemblies, Flip Chips, or other electronics.

The shielding apparatus may use electroplating to apply material to an electronic device. In other embodiments, the shielding apparatus may use Physical Vapor Deposition (PVD) sputtering to apply materials to the electronic device. Sputtering may include ion-beam sputtering, reactive sputtering, ion-assisted deposition, high-target-utilization sputtering, high-power impulse magnetron sputtering, and gas flow sputtering.

The shielding apparatus may first deposit a molding layer on the electronic device. The molding layer may be deposited to encapsulate an integrated circuit (IC) or other package. The materials used may be plastics, metals, or ceramics. In some embodiments, the molding layer may include structures designed to enhance thermal performance, such as a fin heat sink. The molding layer may be applied to the electronic device uniformly.

The shielding apparatus may then deposit an adhesion layer, applied uniformly to the electronic device. The adhesion layer may increase the amount of material that is deposited in a subsequent layer. The adhesion layer may also reduce the occurrence of fractures in a subsequent layer, thereby reducing the number of manufacturing defects. The adhesion layer may include Ti, stainless steel, or other suitable materials.

Figure 8:
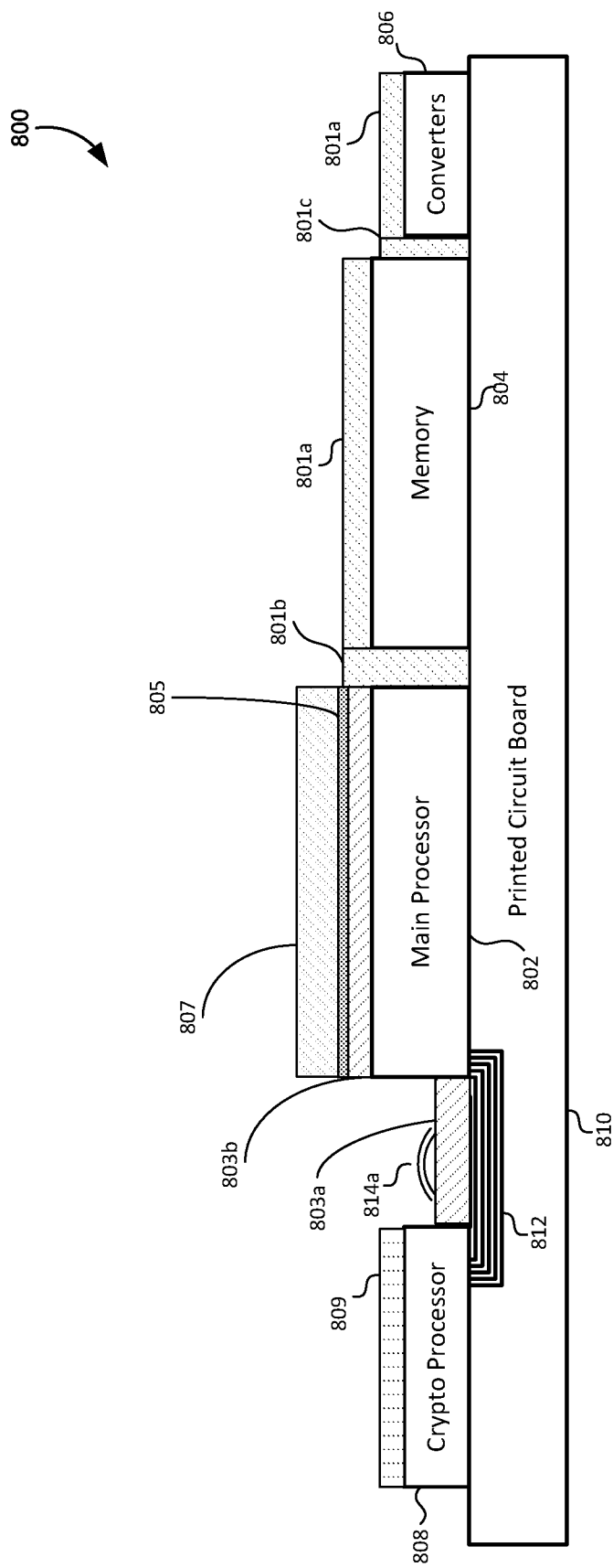
FIG. 8 illustrates an electronic device with materials selectively applied via sputtering according to some embodiments.

FIG. 8 illustrates an electronic device with materials selectively applied via sputtering according to certain embodiments. An electronic device 800 may be similar to the electronic device 200 in FIG. 2. A shielding apparatus may deposit thermal materials and/or EM shielding materials accordingly on the electronic device 200 according to a shielding map, resulting in the electronic device 800. The sputtered layers illustrated in FIG. 8 are merely representative. There may be all, some, or none of the layers in other embodiments.

Blanket sputtering, where a single layer of material is deposited across a location of the electronic device or the entire electronic device, may be bolstered by selective building up of material depth in problem areas. This technique, "blanket sputtering with bolstering," may reduce manufacturing costs through a simplified sputtering process using one material. Blanket sputtering with bolstering may also reduce manufacturing and operational issues due to mismatched CTE's between EM shielding and thermal layers, and the electronic device and associated components.

The thermal material layer 801a-801c illustrates an example of blanket sputtering with bolstering over a portion of the electronic device 800. Referring back to FIG. 2, the memory 204 was shown to be radiating thermal energy 216b. A shielding map associated with the electronic device 200 may direct the shielding apparatus to apply thermal material to mitigate the effects of thermal energy 216b. Returning to FIG. 8, the thermal material layer 801a shows a first thermal material deposited to a uniform depth across the memory 804 and the one or more converters 806. First thermal material may have mitigated thermal energy 214 below a predetermined threshold eliminating the need for additional layers of thermal material.

While the thermal material layer 801a is only shown applied to memory 804 and the one or more converters 806, in other embodiments, the thermal material layer 801a may be applied to every location of the electronic device 800. In some embodiments, certain locations may require a greater material depth than was deposited in the thermal material layer 801a. The thermal material layers 801b and 801c may include the first thermal material as the thermal material layer 801a. According to the shield map, more first thermal material is deposited via sputtering in the thermal material layers 801b and 801c. The greater material depths shown in the thermal material layers 801b and 801c may be deposited in subsequent sputtering processes. The shield map may not include a greater material depth on the memory 804 than that on the one or more converters 806, and, therefore, the shielding apparatus may not deposit any more first thermal material.

Although the thermal material layers 801a through 801c include a first thermal material, other embodiments may employ blanket sputtering with bolstering with EM shielding material. Referring back to FIG. 2, the main processor 202 is emitting noise 214b and the trace 212 is emitting unwanted EM radiation 214a. Returning to FIG. 8, in response to the shielding map, the shielding apparatus may apply an EM shielding layer 803a and 803b. Similar to thermal layer 801a-801c, the shielding map may apply a first EM shielding material to the trace 212 and the main processor 202 to different shielding depths, creating the EM shielding layers 803a and 803b. In some embodiments, the shielding depths of 803a and 803b are determined by the frequency of the noise 214b and the unwanted EM radiation 214a. The shielding depth necessary for the EM shielding layer 803b may be less than the shielding depth of the EM shielding layer 803a due to subsequent layers of material, as discussed below.

The EM shielding layer 803a attenuates the unwanted EM radiation 214a, creating a weaker EM radiation 814a. In some embodiments, the weaker EM radiation 814a may be below a predetermined threshold and determined to be acceptable. In other embodiments, the EM shielding layer 803a may be bolstered to a greater shielding depth. The EM shielding layer 803*b* may have attenuated the noise 214*b* such that is undetectable (and therefore not shown on FIG. 8).

The EM shielding layer 803*b*, an additional layer 805, and an EM shielding layer 807 illustrate a layering technique to shield against a wide frequency range of EM radiation and achieve a predetermined threshold of thermal performance. Layering multiple materials may reduce the necessary shielding depth of the EM shielding layer 803*b* to attenuate a specific frequency below a predetermined threshold.

Referring back to FIG. 2, the main processor 202 is shown emitting noise 214*b* and thermal energy 216*a*. In response to measuring the noise 214*b*, the shielding map may contain instructions, which cause the shielding apparatus to apply the EM shielding layer 803*b* in FIG. 8. The noise 214*b* may be eliminated or reduced below a predetermined threshold and is therefore not shown in FIG. 8.

The main processor 202 may require a thermal material to mitigate the thermal energy 216*b*. Referring now to FIG. 8, in view of FIG. 2, the shielding map may contain instructions which cause a material to be deposited in the EM shielding layer 803*b*, which attenuates the frequency of the noise 214*b* and mitigates the thermal energy 216*a* such that main processor 202 achieves a predetermined threshold of thermal performance. In other embodiments, an additional layer 805 may be a thermal material deposited in response to the thermal energy 216*b*.

In determining EM shielding materials to use in shielding main processor 202 during simulated operation, the computing device may determine that the additional layer 805 should be a dielectric layer, and an EM shielding layer 807 should include a material which shields against a different frequency than is shielded by EM shielding layer 803*b*. Additional layer 805 may be required to isolate EM effects such as conduction or induction in order to mitigate interactions between EM shielding layer 803*b* and the EM shielding layer 807. The computing device may also determine that additional layer 805 is required to mitigate a CTE-mismatch between the EM shielding layer 803*b* and the EM shielding layer 807.

The second EM shielding layer 807 may be an EM shielding material that attenuates a different frequency of EM radiation than the noise 214*b*. In some embodiments, second EM shielding material may be applied to shield against EMI either emitted from the main processor 802 or from an external source. Second EM shielding material may also shield against a second frequency of noise, emitted from the main processor 802.

A third EM shielding layer 809 is shown applied to the cryptographic processor 808. In FIG. 2, the cryptographic processor 808 is not shown to be emitting EM radiation or thermal energy. During simulated operation, the computing device may determine that cryptographic processor is vulnerable to EM attacks, and no other component of the electronic device 800 shares the same vulnerability. In FIG. 8, the third EM shielding layer may have been selectively deposited only to cryptographic processor in order to shield against EM attacks. The third EM shielding layer 809 may include the same materials as the EM shielding layers 803*a* and *b* and the second EM shielding material 807, as well as a different EM shielding material.

Several different techniques of selectively applying materials to an electronic device have been shown according to some embodiments of the invention. It should be appreciated that any or all of techniques shown, such as blanket sputtering with bolstering, layering, and selective deposition of a material, may be applied to a single electronic device. Furthermore, the techniques shown in FIG. 8 may be used for Backside Metallization (BSM). The techniques shown in FIG. 8 are not exhaustive, and are not meant to be limiting. One of ordinary skill in the art would recognize many variations and possibilities with the benefit of this disclosure. Additionally, the layers described in FIG. 8 are for illustrative purposes only and are not meant to be limiting. In alternate embodiments, any layer may be any material. For example, the thermal material layers 801*a*-801*c* may include an EM shielding material instead of or in addition to a thermal material and, therefore be an EM shielding layer. In other words, any layer may include any suitable material for any purpose, as determined by the computing device during simulated operation of the model and included in the shielding map.

The techniques described in FIG. 8 may be applied in several scenarios. In some embodiments, only EM shielding materials may be required as there are no thermal performance issues. In other embodiments, only thermal materials may be required to achieve a predetermined threshold of thermal performance as there are no EM radiation issues. In yet other embodiments, both thermal materials and EM shielding materials may be needed. Additionally, EM shielding materials may be determined in part by their thermal properties. Likewise, thermal materials may be chosen in part by their thermal properties. Materials may also be determined in order to cover a wide range of EM radiation frequencies.

Figure 9:
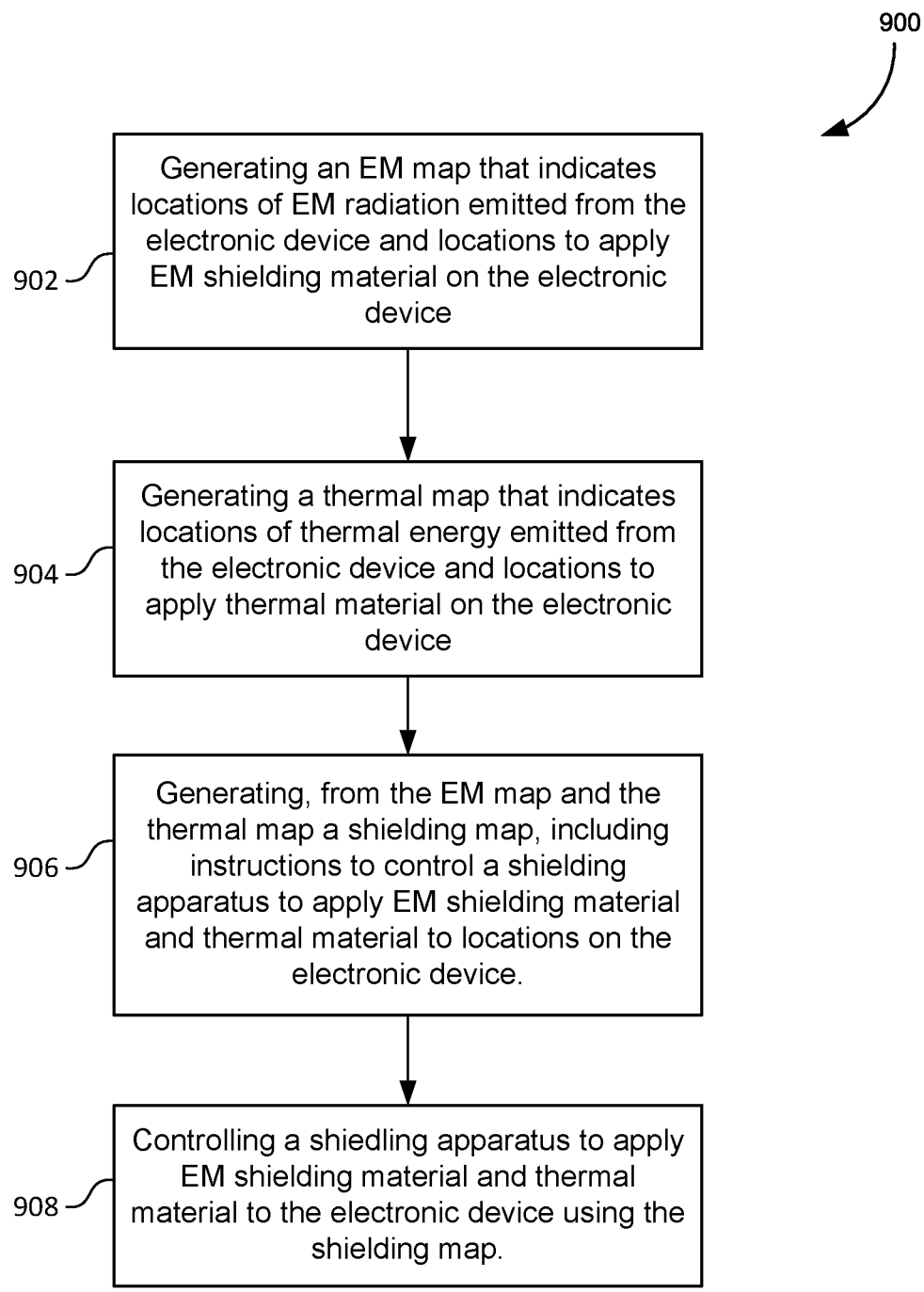
FIG. 9 illustrates a flowchart of a method of selectively applying materials to an electronic device, according to some embodiments.

FIG. 9 illustrates a flowchart 900 of a method of controlling processes for selectively applying materials to an electronic device. The method 900 may include generating an EM map that indicates locations of EM radiation emitted from the electronic device and locations to apply EM shielding materials on the electronic device (902). The locations may be antenna emitting EM radiation intentionally, components of the electronic device emitting EM radiation a noise, unintentional antennas created by traces on a substrate, or other sources of EM radiation. The EM map may be a heat map such as is shown in FIG. 3. The EM map include of information from two dimensions, or may include information from three dimensions. The EM map may also include information about multiple frequencies of EM radiation. The EM map may include a coordinate map of the model and information about EM radiation emitted from the electronic device, magnetic field strengths (magnetic components Hx, Hy and Hz current densities—mA/mm2), S21 coupling (leakage energy—dB/mm) values, spectral values (spurious levels from spectral scan), S11 (return loss (dB) or impedance (ohms Ω) of unwanted/undesired antennas, which helps determine the λ/4 (maxima) and λ/10 (minima) of radiation points for a given noise source and frequency of operation), information describing EM or thermal characteristics of the electronic device.

The EM shielding materials may be selected based on the identification of a specific component. The specific component may require shielding to mitigate noise generated by the specific component to mitigate EMI either emitted by or received by the specific component, to protect against EM attacks, or any other suitable reason. EM shielding materials may be determined based on criteria such as CTE-mismatch, relative magnetic permeability (μr), skin depth (δ), and relative skin effect of one or more EM shielding materials.

The EM map may also include a shielding depth associated with each EM shielding material at each location on the electronic device. This depth may be determined by criteria such as shielding effectiveness (SE) of a potential EM shielding material, thermal properties of the EM shielding material, and other relevant criteria. In some embodiments, the EM map may not include information about EM shielding materials or shielding depths.

The method 900 may also include generating a thermal map that indicates the locations of thermal energy emitted from the electronic device (904). The thermal map may include regions characterized by temperature. The thermal map may also include thermal materials to be applied at each location of the electronic device, determined such that each location of the electronic device achieves a predetermined threshold of thermal performance.

The thermal materials may be selected based on the identification of a specific component requiring a certain thermal performance. The thermal materials may also be selected based on factors such as CTE-mismatch, thermal resistance (R), or other relevant criteria for a thermal material. The thermal material may be applied to redirect thermal energy, radiate thermal energy, or shield against thermal energy.

In some embodiments, the thermal map may also include a material depth associated with each thermal material at each location on the electronic device. This depth may be determined by a threshold of thermal performance required for each location of the electronic device or other relevant criteria. In other embodiments, the thermal map may not include information about thermal materials or material depths.

The method 900 may also include generating a shielding map from the EM map and the thermal map, including instructions to control a shielding apparatus to apply EM shielding material and thermal material to locations on the electronic device (906). The shielding map may include a coordinate map of the model and information about EM radiation emitted from the electronic device, such as magnetic field strengths (magnetic components Hx, Hy, and Hz current densities—mA/mm2), S21 coupling (leakage energy—dB/mm) values, spectral values (spurious levels from spectral scan), S11 (return loss (dB) or impedance (ohms $\Omega$) of unwanted/undesired antennas, which helps determine the $\lambda/4$ (maxima) and $\lambda/10$ (minima) of radiation points for a given noise source and frequency of operation), and other EM data. The shielding map may also include thermal data, such as thermal resistance (R), junction to case thermal resistance ($\theta$jc), and other relevant thermal data.

The shielding map may also include data, including EM shielding materials and associated shielding depths for every location on the electronic device. The shielding depths for each EM shielding material may be identical for all locations on the electronic device or may be varied at each location on the electronic device. The EM shielding materials may be different at every location of the electronic device or may be identical across the electronic device. In some embodiments, EM shielding materials are determined by a computing device when the shielding map is generated. In other embodiments, the EM shielding materials are included in the EM map.

Similarly, the shielding map may include data about thermal materials and associated material depths for every location on the electronic device. The material depths for each thermal material may be identical for all locations on the electronic device or may be varied at each location on the electronic device. The thermal materials may be different at every location of the electronic device or may be identical across the electronic device. In some embodiments, thermal materials are determined by a computing device when the shielding map is generated. In other embodiments, the thermal materials are included in the thermal map.

The method 900 may also include controlling a shielding apparatus to apply EM shielding material and thermal material to the electronic device using the shielding map (908). The shielding apparatus may be operable to deposit material on the electronic device through electroplating or Physical Vapor Deposition (PVD) sputtering to apply materials to the electronic device. Sputtering may include ion-beam sputtering, reactive sputtering, ion-assisted deposition, high-target-utilization sputtering, high-power impulse magnetron sputtering, and gas flow sputtering.

In response to the shielding map, the shielding map may deposit EM shielding materials and thermal materials on the electronic device using techniques described herein such as blanket sputtering with bolstering, layering, or selective application. One of ordinary skill in the art would recognize many different variations and possibilities with the benefit of this disclosure.

It should be appreciated that the specific steps illustrated in FIG. 9 provide particular methods of assembling a circuit assembly according to various embodiments. Other sequences of steps may also be performed according to alternative embodiments. For example, alternative embodiments may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. Many variations, modifications, and alternatives also fall within the scope of this disclosure.

Figure 10:
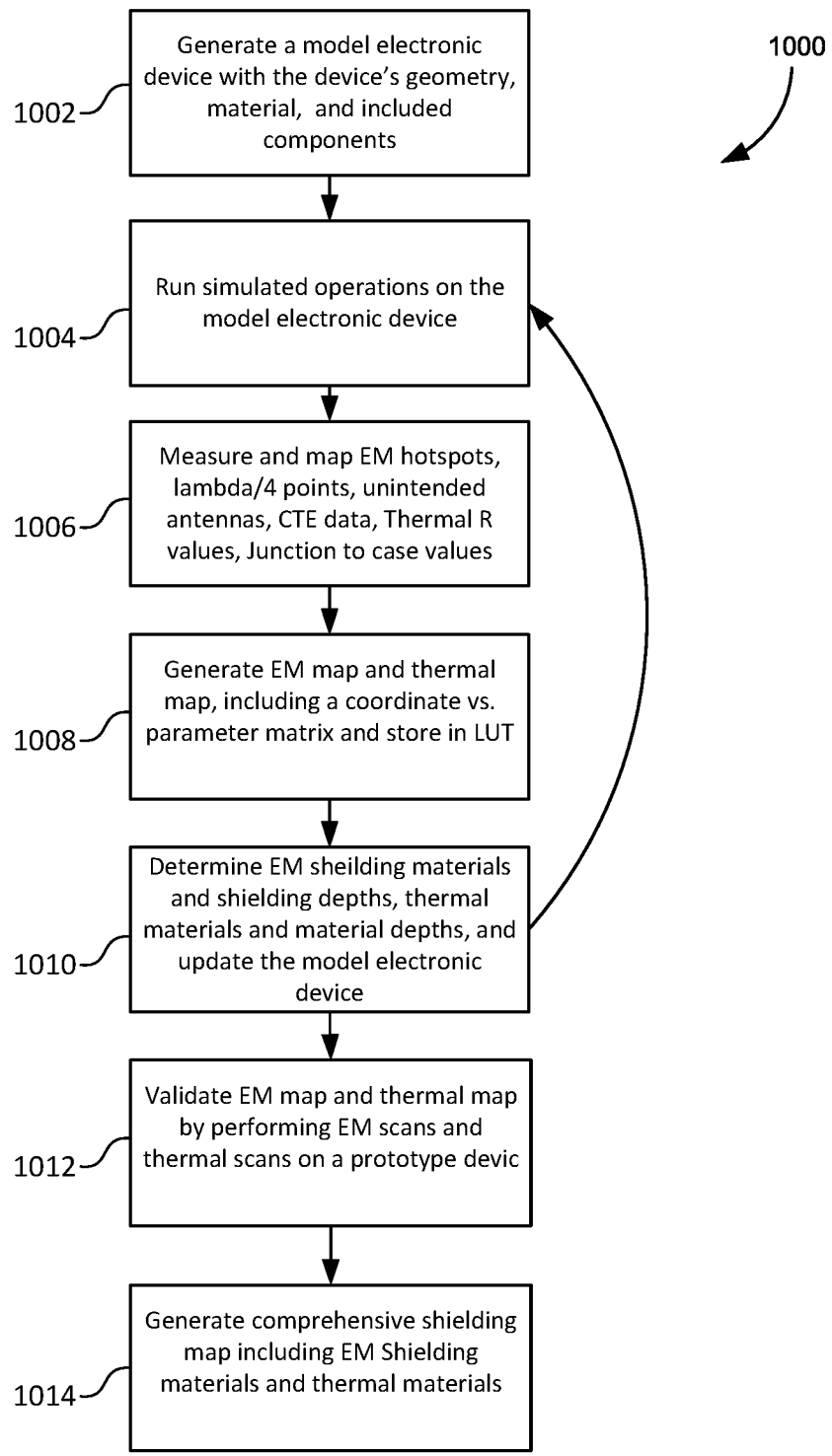
FIG. 10 illustrates a flowchart of a method for generating a comprehensive shielding map, according to some embodiments.

FIG. 10 illustrates a flowchart of a method 1000 for generating, by a computing device, a comprehensive shielding map. The method may include generating a model with information about the model's geometry, materials, and included components. The model may include a substrate, fabricated from glass, organic compounds, PCB, or any other suitable material. The model may include representations of integrated circuits, chiplets on a substrate, flip chip packages, or any other type of electronic device. The model may include a 3-D representation of the model.

The method 1000 may also include performing simulated operations on the model electronics device (1004). The simulated operation can include running the model at an expected level. The expected level may include expected operating voltages and currents applied to various components of the modelled electronic device. The expected level may also include expected operating frequencies of components such as radio units or antennas. The simulation may include external factors. External factors may include EMI or thermal energy from external sources. These sources may be as a result of other electronic devices within a larger system or from other devices apart from a larger system. External factors may also include sources of thermal energy and EM radiation from a typical operating environment.

The method 1000 may also include measuring and mapping thermal hotspots, EM hotspots, $\lambda/4$ points, unintended antennas, CTE values, thermal R values, and $\theta$jc values (1006). The EM hotspots may include the magnitude of various frequencies of EM radiation and the strength of a magnetic field. $\lambda/4$ points may be measured from an unintentional antenna and from components emitting EM radiation intentionally.

The method 1000 may also include generating an EM map and a thermal map, including coordinate versus parameter matrix, which is stored in a LUT (1008). This LUT may include a (x, y, z) coordinate map of the model, EM hotspots, $\lambda/4$ points, unintended antennas, CTE values, thermal R values, and θjc values. The coordinate versus parameter matrix may correlate data from the thermal and EM measurements to each location on the electronic device.

The method 1000 may also include determining, by the computing device, EM shielding materials and associated shieling depths, thermal materials and associated material depths, and update the model (1010). The computing device may determine that a location on the model requires shielding against one or more frequencies of EM radiation. The computing device may utilize criteria such as CTE-mismatch, relative magnetic permeability (μr), skin depth (δ), and relative skin effect between the potential EM shielding layers. The computing device may determine that various alloys are suitable EM shielding materials. In some embodiments, the computing device may determine that a first layer of first potential EM shielding material and a second layer of second potential EM shielding may be appropriate. A dielectric layer may be used between the first and second potential EM shielding layers.

The computing device may choose a thermal material and determine a material depth for each location on the electronic device based on predetermined threshold of thermal performance. Thresholds for thermal performance may include heat conduction, absorption, or radiation. Various thermal materials may be contained in a database, accessible by the computing device to achieve one or more predetermined thresholds of thermal performance. Furthermore, various locations of the modeled electronic device may include varying thresholds of thermal performance and thus require the application of varying thermal materials to varying material depths.

Blocks 1004-1010 may be repeated iteratively until all locations on the model achieve a predetermined threshold of EM radiative performance. Blocks 1004-1010 may be repeated iteratively until all location on the model achieve a predetermined threshold of thermal performance. The LUT in FIG. 4 and block 1008 may be updated after each iteration.

The method 1000 may include validating the EM map and thermal map by performing EM scans and thermal scans of a prototype device. The EM scans may be done by a computing device. The scans may examine each location of the prototype and measure the magnitude of the EM radiation emitted by the prototype at that location. Multiple scans may be performed for multiple frequencies of EM radiation.

The EM scans may then be combined and correlated to a coordinate map of the prototype generating an EM map of the prototype showing the magnitudes of multiple frequencies of EM radiation at all location of the prototype. The EM map of the prototype may be compared to the EM map. If discrepancies between the EM map of the prototype and the final EM map are found, the EM scans may be repeated or corrections made to the model.

The thermal scans may be performed by a computing device with a thermal imaging apparatus. The result of the thermal scans are then correlated with a coordinate map of the prototype, creating a thermal map of the prototype. The thermal map of the prototype may then be compared to the thermal map. If discrepancies between the thermal map of the prototype and the thermal map are found, the thermal scans may be repeated. The simulated operation of the model may also be repeated or corrections made to the model.

The method 1000 may also include generating, by a computing device, a comprehensive shielding map, including EM shielding materials and thermal materials. The shielding map may include a coordinate map of the model, information about EM radiation emitted from the electronic device such as magnetic field strengths (magnetic components Hx, Hy, and Hz current densities—mA/mm2), S21 coupling (leakage energy—dB/mm) values, spectral values (spurious levels from spectral scan), S11 (return loss (dB) or impedance (ohms Ω) of unwanted/undesired antennas, which helps determine the λ/4 (maxima) and λ/10 (minima) of radiation points for a given noise source and frequency of operation), and other relevant EM data. The shielding map may also include thermal data, such as thermal resistance (R), junction to case thermal resistance (θjc), and other relevant thermal data.

The shielding map may also include data, including EM shielding materials and associated shielding depths for every location on the electronic device. The shielding depths for each EM shielding material may be identical for all locations on the electronic device or may be varied at each location on the electronic device. The EM shielding materials may be different at every location of the electronic device or may be identical across the electronic device.

Similarly, the shielding map may include data about thermal materials and associated material depths for every location on the electronic device. The material depths for each thermal material may be identical for all locations on the electronic device or may be varied at each location on the electronic device. The thermal materials may be different at every location of the electronic device or may be identical across the electronic device.

It should be appreciated that the specific steps illustrated in FIG. 10 provide particular methods of protecting communications between two processors according to various embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
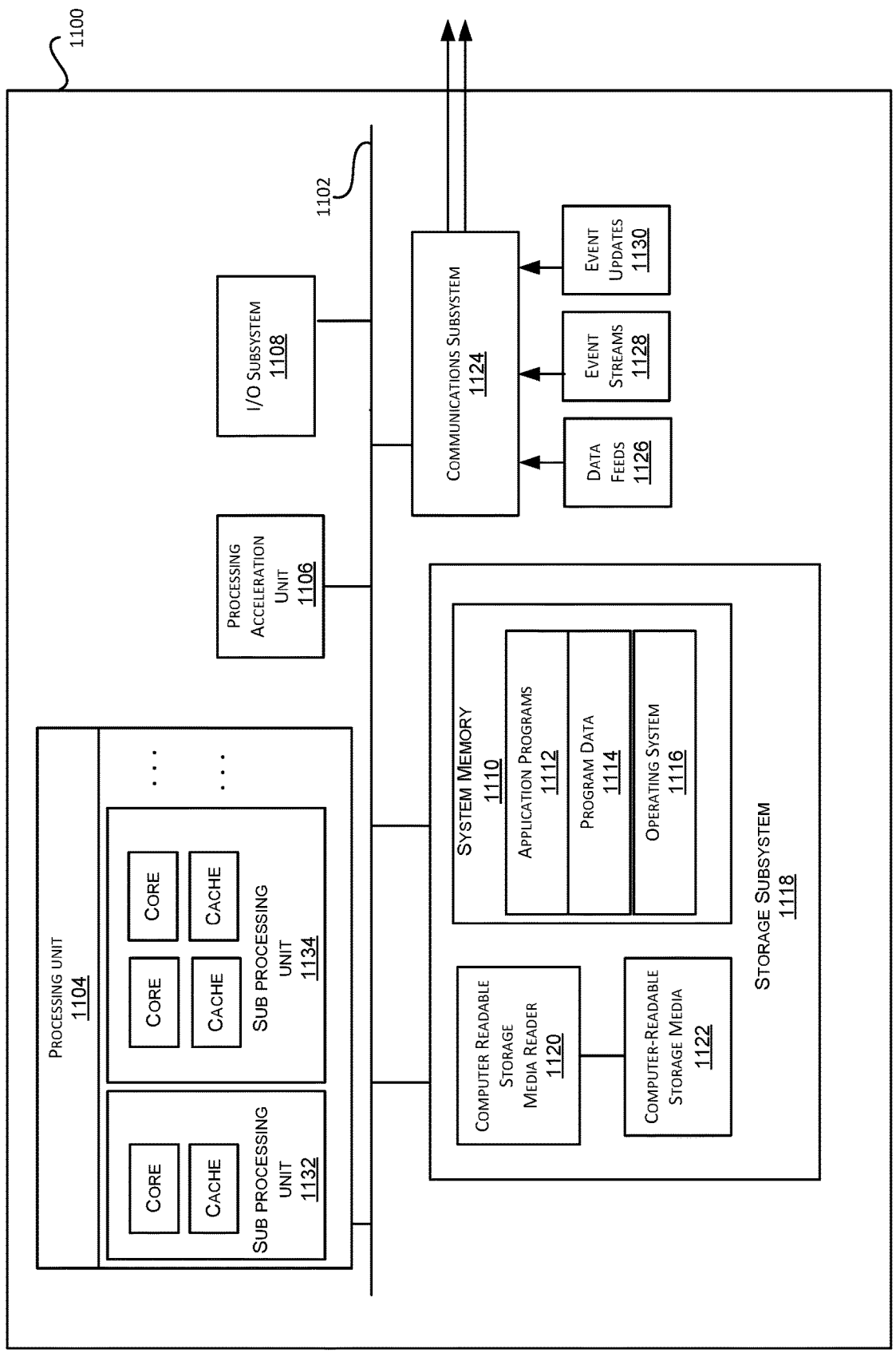
FIG. 11 illustrates an exemplary computer system, in which various embodiments may be implemented.

FIG. 11 illustrates an exemplary computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with some embodiments.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

As used herein, the terms "about" or "approximately" or "substantially" may be interpreted as being within a range that would be expected by one having ordinary skill in the art in light of the specification.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of controlling processes for applying material to an electronic device, the method comprising:
   generating an electromagnetic (EM) map of an electronic device that indicates locations of EM radiation emitted from the electronic device;
   generating a thermal map of the electronic device that indicates locations of thermal energy emitted from the electronic device;
   generating, from the EM map and the thermal map, a shielding map comprising instructions to control a shielding apparatus, comprising:
      locations on the electronic device to apply an EM shielding material; and
      locations on the electronic device to apply a thermal material; and
   controlling, using the shielding map, a shielding apparatus to apply the EM shielding material and the thermal material to the electronic device.

2. The method of claim 1 wherein generating the EM map further comprises:
   simulating a model of the electronic device to measure EM radiation;
   determining locations of EM radiation on the electronic device;
   creating a mapping of the locations of EM radiation on the electronic device; and
   determining EM shielding materials to be applied at locations on the electronic device.

3. The method of claim 2, further comprising:
   generating a model of the electronic device.

4. The method of claim 1 wherein generating the thermal map comprises:
   simulating a model of the electronic device to measure a thermal behavior of the electronic device;
   determining locations of thermal energy on the electronic device;
   creating a heat map of the electronic device; and
   determining thermal materials to be applied at locations on the electronic device.

5. The method of claim 1 wherein generating the EM map further comprises:
   receiving data from probing a prototype of the electronic device;
   measuring EM radiation from a scan of the electronic device;

determining locations of EM radiation generated on the electronic device; and creating a map of the locations of EM radiation on the electronic device.

6. The method of claim 1 wherein generating the thermal map further comprises:
   receiving data from probing a prototype of the electronic device;
   receiving data from a thermal scan of the electronic device;
   determining locations of thermal energy on the electronic device; and
   creating a heat map of the electronic device.

7. The method of claim 1 wherein the EM map and the thermal map comprise (x,y,z) coordinates.

8. The method of claim 1 wherein generating the EM map comprises identifying locations that are vulnerable to EM attacks.

9. The method of claim 8 wherein identifying the locations that are vulnerable to EM attacks comprises identifying locations of antennas.

10. A non-transitory computer-readable medium comprising instructions that, when executed by one or more processors, cause the one or more processors to perform operations comprising:
    receiving an electromagnetic (EM) map of an electronic device that indicates locations of EM radiation generated on the electronic device;
    receiving a thermal map of the electronic device that indicates locations of thermal energy generated on the electronic device; and
    generating, from the EM map and the thermal map, a shielding map comprising instructions to control a shielding apparatus, comprising:
       locations on the electronic device to apply an EM shielding material; and
       locations on the electronic device to apply a thermal material; and
    providing the shielding map to a shielding apparatus to apply the EM shielding material and the thermal material to the electronic device.

11. The non-transitory computer-readable medium of claim 10 wherein generating the shielding map further comprises:
    determining one or more EM shielding materials to be applied to each location based on one or more frequencies; and
    determining a depth of each thermal material to be applied to each location based on a magnitude of each frequency.

12. The non-transitory computer-readable medium of claim 10 wherein generating the shielding map further comprises:
    mapping one or more thermal materials to each location based on a predetermined threshold of thermal performance; and
    mapping a shielding depth of each thermal material to each location based on a magnitude of thermal energy.

13. The non-transitory computer-readable medium of claim 10 wherein providing the shielding map comprises sending the shielding map from a first computing device to a shielding apparatus operable to deposit an EM shielding material and a thermal material on the electronic device.

14. The non-transitory computer-readable medium of claim 10 wherein providing the shielding map comprises causing components of a computing device to execute commands which control a shielding apparatus operable to deposit an EM shielding material and a thermal material on the electronic device.

15. A system comprising:
    a shielding apparatus operable to deposit an electromagnetic (EM) shielding material and a thermal material on an electronic device;
    one or more processors; and
    one or more memory devices comprising instructions that, when executed by the one or more processors, cause the one or more processors to perform operations comprising:
    receiving an electromagnetic (EM) map of an electronic device that indicates locations of EM radiation generated on the electronic device;
    receiving a thermal map of the electronic device that indicates locations of thermal energy generated on the electronic device;
    generating, from the EM map and the thermal map, a shielding map comprising instructions to control a shielding apparatus, comprising:
       locations on the electronic device to apply an EM shielding material; and
       locations on the electronic device to apply a thermal material; and
    providing the shielding map to the shielding apparatus to apply the EM shielding material and the thermal material to the electronic device.

16. The system of claim 15 wherein the shielding apparatus is operable to apply the EM shielding material and the thermal material according to the shielding map via electroplating.

17. The system of claim 15 wherein the shielding apparatus is operable to apply the EM shielding material and the thermal material via sputtering according to the shielding map, wherein the shielding apparatus is further operable to deposit at least one layer of EM shielding material to a first shielding depth as a function of a frequency of EM radiation and deposit a layer of thermal material to a material depth.

18. The system of claim 17 wherein the at least one layer of EM shielding material comprises a layer of an electrical conductor for high frequency EM shielding and a layer of a magnetic conductor for low frequency shielding.

19. The system of claim 17 wherein the at least one layer of EM shielding material comprises a layer of alloy providing high frequency EM shielding and low frequency EM shielding to within a predetermined threshold.

20. The system of claim 15 wherein the electronic device comprises one or more integrated circuit packages mounted on a substrate fabricated from glass or an organic material.

* * * * *